US012792529B2

(12) United States Patent
Wu et al.

(10) Patent No.: US 12,792,529 B2
(45) Date of Patent: Nov. 10, 2026

(54) METHOD AND DEVICE FOR SEQUENTIAL READ COMMAND THROUGHPUT FOR LOGICAL-TO-PHYSICAL LOOK-UP

(71) Applicant: Samsung Electronics Co., Ltd., Gyeonggi-do (KR)

(72) Inventors: Chun-Chu Chen-Jhy Archie Wu, San Carlos, CA (US); Mark Allen Gaertner, Fort Myers, FL (US); James David Sawin, Sterling, MA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 19/210,750

(22) Filed: May 16, 2025

(65) Prior Publication Data

US 2025/0383998 A1 Dec. 18, 2025

Related U.S. Application Data

(60) Provisional application No. 63/659,550, filed on Jun. 13, 2024.

(51) Int. Cl.
*G06F 13/18* (2006.01)
*G06F 13/16* (2006.01)

(52) U.S. Cl.
CPC .......... *G06F 13/1626* (2013.01); *G06F 13/18* (2013.01)

(58) Field of Classification Search
CPC ............................ G06F 13/1626; G06F 13/18
USPC ................................................. 711/154, 103
See application file for complete search history.

(56) References Cited

U.S. PATENT DOCUMENTS

| | | | |
|---|---|---|---|
| 6,292,795 | B1 | 9/2001 | Peters et al. |
| 9,977,623 | B2 | 5/2018 | Jean et al. |
| 10,846,226 | B2 | 11/2020 | Navon et al. |
| 11,409,651 | B2 | 8/2022 | Jean et al. |
| 11,662,952 | B2 | 5/2023 | Kanno |
| 2010/0049952 | A1 | 2/2010 | Eddy et al. |

FOREIGN PATENT DOCUMENTS

| | | |
|---|---|---|
| KR | 1020090046568 | 5/2009 |

*Primary Examiner* — Hashem Farrokh
(74) *Attorney, Agent, or Firm* — The Farrell Law Firm, P.C.

(57) ABSTRACT

Methods and devices are provided in which a controller of a storage device groups physical page number (PPN) entries into PPN segments. The PPN entries correspond to a command received at the storage device. The controller classifies the PPN segments into bin queues of the storage device based on PPN segment size and PPN entry placement with respect to a physical page (PPA) granularity. The controller packs a PPA with one or more PPN segments from the bin queues to the PPA granularity, and releases the PPA.

22 Claims, 13 Drawing Sheets

METHOD AND DEVICE FOR SEQUENTIAL READ COMMAND THROUGHPUT FOR LOGICAL-TO-PHYSICAL LOOK-UP

PRIORITY

This application is based on and claims priority under 35 U.S.C. § 119(e) to U.S. Provisional Patent Application Ser. No. 63/659,550, filed on Jun. 13, 2024, the entire contents of which are incorporated herein by reference.

TECHNICAL AREA

The present disclosure relates generally to data storage management systems, and more particularly, to a method for sequential read command execution in a data storage management system.

BACKGROUND

The present background section is intended to provide context only, and the disclosure of any concept in this section does not constitute an admission that said concept is prior art.

Complexities in data storage management continue to grow with increasing computational demand. The computational demand may be demonstrated through an increase in commands (e.g., read commands, write commands, or copy commands), issued by a host and inserted into a data storage management system for execution. A logical address (e.g., logical page number (LPN)) may be mapped to a physical address (e.g., physical page number (PPN) at a one-to-one ratio via a logical-to-physical (L2P) look-up table (LUT). As drive size increases, the L2P LUT upscales in a non-linear manner, and sequential read performance may be inhibited when intermixed with other read commands or portions of other read commands. A need exists to maximize sequential read commands without the resulting additional logic and delay required for packing or powering extra read commands.

SUMMARY

According to an embodiment, a method is provided in which a controller of a storage device groups physical page number (PPN) entries into PPN segments. The PPN entries correspond to a command received at the storage device. The controller classifies the PPN segments into bin queues of the storage device based on PPN segment size and PPN entry placement with respect to a physical page (PPA) granularity. The controller packs a PPA with one or more PPN segments from the bin queues to the PPA granularity, and releases the PPA.

According to this embodiment, grouping the PPN entries may include segmenting the PPN entries into the PPN segments based on the PPA granularity or sequence identifier (ID) tags on the PPN entries corresponding to the PPN segments. The controller may perform a hash function on the PPN segments from a PPN granularity to the PPA granularity. The bin queues may include a first queue and second bin queues, where the first bin queue, which may also be referred to as a straight-hand bin queue, is configured to store PPN segments having a size equal to the PPA granularity, and the second bin queues, which may also be referred to as runt bin queues, are configured to store PPN segments having fewer PPN entries than the PPA granularity. The runt bin queues comprise a set of bin queues for each PPN segment size less than the PPA granularity and each set comprises bin queues for different PPN entry placements.

According to this embodiment, packing the PPA may include one of straight-hand packing with a single PPN segment from the straight-hand bin queue, or packing to PPA granularity with at least two PPN segments from at least one of the runt bin queues. Packing to PPA granularity may include one of: first packing to PPA granularity with the at least two PPN segments, where PPN entry placements of the at least two PPN segments are complementary for PPA granularity; second packing to PPA granularity with the at least two PPN segments with PPN entry overlap between the at least two PPN segments, where an overlapping PPN entry is restocked at a bin queue corresponding to a size and placement of the overlapping PPN entry; third packing to PPA granularity with the at least two PPN segments with conflict resolution moving at least one PPN entry to a different placement to complete PPA granularity; or fourth packing to PPA granularity with the at least two PPN segments with conflict resolution moving the at least one PPN entry to the different placement and PPN entry overlap between the at least two PPN segments, where the overlapping PPN entry is restocked at the bin queue corresponding to the size and placement of the overlapping PPN entry.

According to this embodiment, a type of packing may be determined from among the straight-hand packing, the first packing, the second packing, the third packing, and the fourth packing based on packing priority and bin queues with PPN segments. At least one of the bin queues may be drained based on the determined type of packing. In determining the type of packing, the straight-hand packing may be performed upon reception of the single PPN segment at the straight-hand bin queue, the first packing may be performed upon reception of the at least one PPN segments with PPN entry placements that are complementary for PPA granularity, and the second packing, the third packing, or the fourth packing may be performed in case that a bin queue is full. Determining the type of packing from among the second packing, the third packing, and the fourth packing may be based on a cost function based on a first number of overlapping PPN entries to be restocked and a second number of conflicting PPN entries to be moved. Determining the type of packing from among the second packing, the third packing, and the fourth packing may be based on packing priority, where the second packing may have a highest packing priority, followed by the third packing and the fourth packing. A full PPA may be split into the PPA and at least a second PPA, where the PPA granularity is a portion of a full PPA granularity.

According to an embodiment, a storage device is provided that includes a controller and a non-transitory computer readable storage medium storing instructions. When executed, the instructions cause the controller to group PPN entries into PPN segments. The PPN entries correspond to a command received at the storage device. The instructions also cause the controller to classify the PPN segments into bin queues of the storage device based on PPN segment size and PPN entry placement with respect to a PPA granularity. The instructions further cause the controller to pack a PPA with one or more PPN segments from the bin queues to the PPA granularity and release the PPA.

According to this embodiment, grouping the PPN entries may include segmenting the PPN entries into the PPN segments based on the PPA granularity or sequence identifier (ID) tags on the PPN entries corresponding to the PPN segments. The controller may perform a hash function on the PPN segments from a PPN granularity to a PPA granularity.

The bin queues may include a straight-hand bin queue and runt bin queues, where the straight-hand bin queues are configured to store PPN segments having a size equal to the PPA granularity, and the runt bin queues are configured to store PPN segments having fewer PPN entries than the PPA granularity. The runt bin queues comprise a set of bin queues for each PPN segment size less than the PPA granularity and each set comprises bin queues for different PPN entry placements.

According to this embodiment, packing the PPA may include one of straight-hand packing with a single PPN segment from the straight-hand bin queue, or packing to PPA granularity with at least two PPN segments from at least one of the runt bin queues. Packing to PPA granularity may include one of: first packing to PPA granularity with the at least two PPN segments, where PPN entry placements of the at least two PPN segments are complementary for PPA granularity; second packing to PPA granularity with the at least two PPN segments with PPN entry overlap between the at least two PPN segments, where an overlapping PPN entry is restocked at a bin queue corresponding to a size and placement of the overlapping PPN entry; third packing to PPA granularity with the at least two PPN segments with conflict resolution moving at least one PPN entry to a different placement to complete PPA granularity; or fourth packing to PPA granularity with the at least two PPN segments with conflict resolution moving the at least one PPN entry to the different placement and PPN entry overlap between the at least two PPN segments, where the overlapping PPN entry is restocked at the bin queue corresponding to the size and placement of the overlapping PPN entry.

According to this embodiment, a type of packing may be determined from among the straight-hand packing, the first packing, the second packing, the third packing, and the fourth packing based on packing priority and bin queues with PPN segments. At least one of the bin queues may be drained based on the determined type of packing. In determining the type of packing, the straight-hand packing may be performed upon reception of the single PPN segment at the straight-hand bin queue, the first packing may be performed upon reception of the at least one PPN segments with PPN entry placements that are complementary for PPA granularity, and the second packing, the third packing, or the fourth packing may be performed in case that a bin queue is full. Determining the type of packing from among the second packing, the third packing, and the fourth packing may be based on a cost function based on a first number of overlapping PPN entries to be restocked and a second number of conflicting PPN entries to be moved. Determining the type of packing from among the second packing, the third packing, and the fourth packing may be based on packing priority, where the second packing may have a highest packing priority, followed by the third packing and the fourth packing. The instructions may further cause the controller to split a full PPA into the PPA and at least a second PPA, where the PPA granularity is a portion of a full PPA granularity.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale. The above and other aspects, features, and advantages of certain embodiments of the present disclosure will be more apparent from the following detailed description, taken in conjunction with the accompanying drawings, in which.

DETAILED DESCRIPTION

Figure 1:
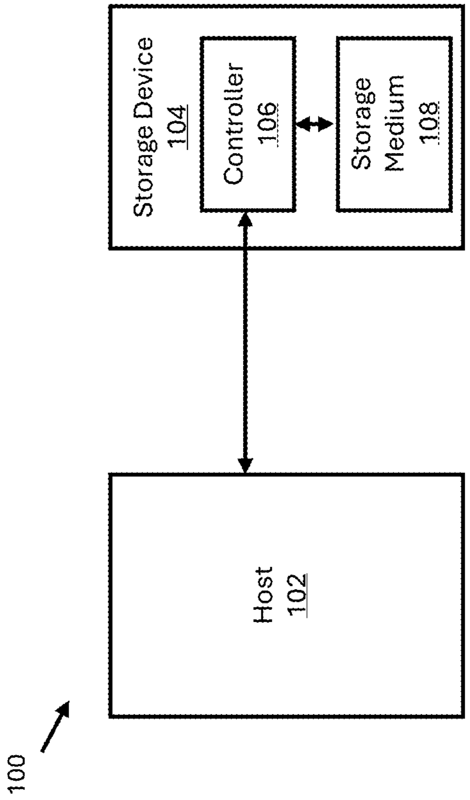
FIG. 1 is a diagram illustrating a data storage management system for processing commands in an electronic device, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1$^{st}$," "2$^{nd}$," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, firmware, or combination thereof, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC), a co-processor, or field programmable gate arrays (FPGAs).

An electronic device, according to one embodiment, may be one of various types of electronic devices utilizing storage devices (e.g., memory devices). The electronic device may use any suitable storage standard, such as, for example, peripheral component interconnect express (PCIe), nonvolatile memory express (NVMe), NVMe-over-fabric (NVMeoF), advanced extensible interface (AXI), ultra path interconnect (UPI), ethernet, transmission control protocol/Internet protocol (TCP/IP), remote direct memory access (RDMA), RDMA over converged ethernet (ROCE), fibre channel (FC), infiniband (IB), serial advanced technology attachment (SATA), small computer systems interface (SCSI), serial attached SCSI (SAS), Internet wide-area RDMA protocol (iWARP), and/or the like, or any combination thereof. In some embodiments, an interconnect interface may be implemented with one or more memory semantic and/or memory coherent interfaces and/or protocols including one or more compute express link (CXL) protocols such as CXL.mem, CXL.io, and/or CXL.cache, Gen-Z, coherent accelerator processor interface (CAPI), cache coherent interconnect for accelerators (CCIX), and/or the like, or any combination thereof. Any of the memory devices may be implemented with one or more of any type of memory device interface including double data rate (DDR), DDR2, DDR3, DDR4, DDR5, low-power DDR (LPDDRX), open memory interface (OMI), Nvlink high bandwidth memory (HBM), HBM2, HBM3, and/or the like. The electronic devices may include, for example, a portable communication device (e.g., a smart phone), a computer, a portable multimedia device, a portable medical device, a camera, a wearable device, or a home appliance. However, an electronic device is not limited to those described above.

FIG. 1 is a diagram illustrating a data storage management system for processing commands in an electronic device, according to an embodiment. A storage system 100 includes a host 102 and a storage device 104 (e.g., a memory device). Although one host and one storage device are depicted, the storage system 100 may include multiple hosts and/or multiple storage devices. The storage device 104 may be an SSD, a universal flash storage (UFS), etc. The storage device 104 includes a controller 106 and a storage medium 108 connected to the controller 106. The controller 106 may be an SSD controller, a UFS controller, etc. The storage medium 108 may include a volatile memory, a non-volatile memory, or both, and may include one or more flash memory chips (or other storage media). The controller 106 may include one or more processors, one or more error correction circuits, one or more FPGAs, one or more host interfaces, one or more flash bus interfaces, etc., or a combination thereof. The controller 106 may be configured to facilitate transfer of data/commands between the host 102 and the storage medium 108. The host 102 sends data/commands to the storage device 104 to be received by the controller 106 and processed in conjunction with the storage medium 108.

Figure 2:
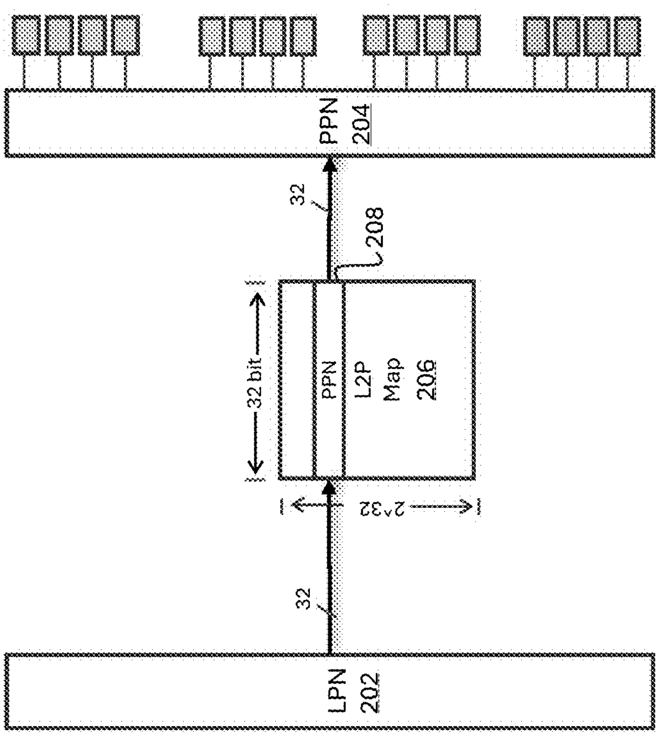
FIG. 2 is a diagram illustrating an LPN to PPN mapping.

FIG. 2 is a diagram illustrating an LPN to PPN mapping. An LPN 202 may be mapped to a PPN 204 via an L2P LUT 206. The L2P LUT 206 includes $2^{32}$ individual PPN entries 208 of 32 bits each, resulting in a 16 gigabyte (GB) L2P LUT. However, if drive size increases, the L2P LUT scales up in both entry count and width as shown in Table 1 below.

TABLE 1

| N | Drive Size (TB) | Entry Count | Width | Table Size (GB) | Ratio |
|---|---|---|---|---|---|
| 32 | 16 | $2^{32}$ | 32 | 16 | 1.00X |
| 33 | 32 | $2^{33}$ | 33 | 34 | 2.06X |
| 34 | 64 | $2^{34}$ | 34 | 70 | 4.25X |
| 35 | 128 | $2^{35}$ | 35 | 143 | 8.75X |
| 36 | 256 | $2^{36}$ | 36 | 295 | 9.00X |

A PPN entry value may expand if not 8 bit aligned. For example, an increase from a 16 terabyte (TB) drive to a 64 TB drive results in a PPN entry count increasing from $2^{32}$ to $2^{34}$ and an entry width increasing from 32 to 34 bits. The 34 bits is increased to 40 bits for 8 bit alignment, and a resulting table size increases from 16 GB to 80 GB.

The memory is not a single linear address based on PPN. Instead there are multiple levels of granularity. For example, a single physical page (PPA) may include four PPNs, a single word line (WL) may include three PPAs, and a single physical plane may include multiple WLs. If a batch read command is four PPNs in a PPA, there is ¼ read latency. Similarly, if a batch read command is four PPAs from four planes, there is ¼ read latency. A write command may be required to write in a batch of 48 PPNs (e.g., four planes, with 3 PPAs per plane, and 4 PPNs per PPA).

Figure 3:
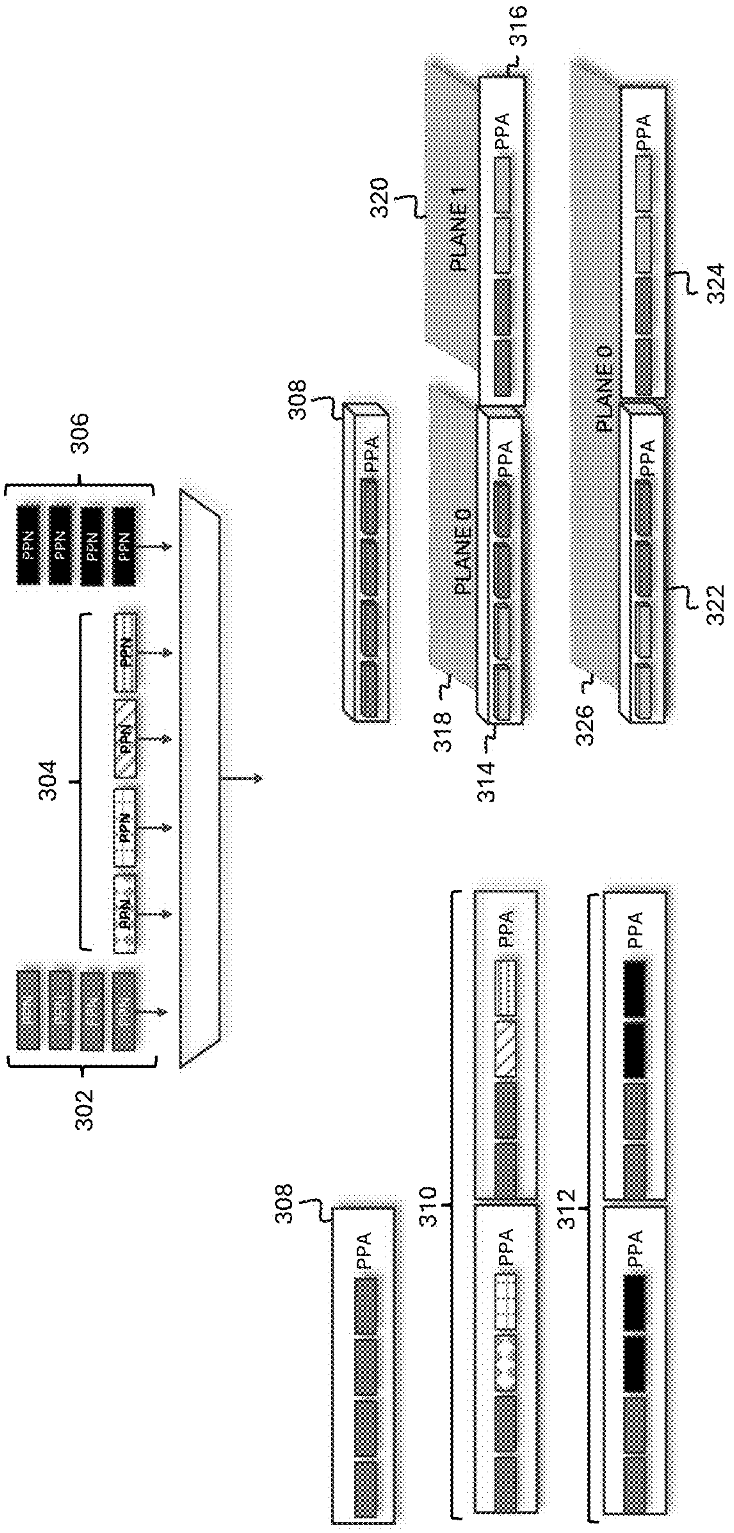
FIG. 3 is a diagram illustrating sequential read command operation.

FIG. 3 is a diagram illustrating sequential read command operation. A first stream of sequential read commands 302, random read commands 304, and a second stream of sequential read commands 306 may be received by the storage device. Maximum sequential read performance may be achieved when all PPNs from the first stream 302 are attributed to single PPA 308. Sequential read performance may be inhibited when PPNs from the first stream 302 are intermixed with the random read commands 304 across PPAs 310, or intermixed with the second stream of sequential read commands 306 across PPAs 312. While sequential read performance may not be affected by splitting PPNs from the first stream 302 across PPAs 314 and 316 in different planes, plane-0 318 and plane-1 320 (e.g., plane independent read (PIR)), sequential read performance may be inhibited when PPNs from the first stream 302 are split across PPAs 322 and 324 in a single plane, plane-0 326. However, a PIR may also have a resultant effect of requiring additional power for an extra read and requiring additional logic and delay for packing the data from the different planes 318 and 320 before output. This may also cause die collision with other concurrent access.

Figure 4:
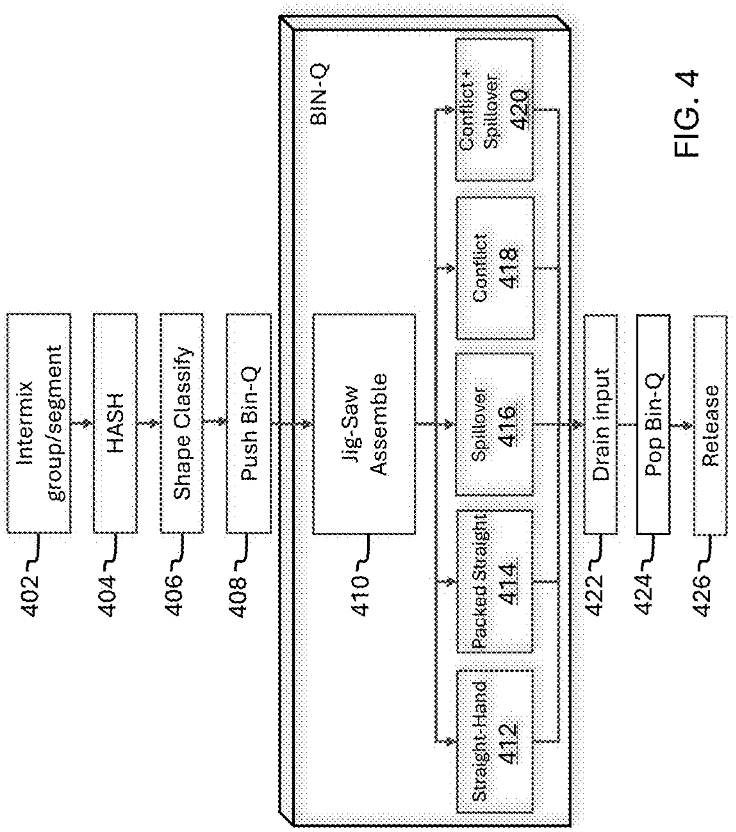
FIG. 4 is a flowchart illustrating a method for command processing at a storage device, according to an embodiment.

FIG. 4 is a flowchart illustrating a method for command processing at a storage device, according to an embodiment. The method of FIG. 4 enables sequential write stream isolation without intermixing, as described above with respect to FIG. 3. The method of FIG. 4 also enables sequential write packing in a PPA. At 402, segmentation and grouping may be performed on a sequential input in order to output segmented and/or grouped sequential output, as described in greater detail below with respect to FIG. 5. At 404, a hash function is performed on the sequential output. At 406, each segment of the sequential output may be shape classified (e.g., straight-hand, runt-1, runt-2, runt-3). At 408, the shape classified segments are pushed to bin queues based on their categorized shape. The bin queues may be two-dimensional or a bit map. At 410, jig-saw assembly of PPAs may be performed using segments from the different bin queues. PPA assembly may include straight-hand packing 412 (e.g., single segment is equal PPA granularity), multiple segments packed to PPA granularity 414, multiple segments packed to PPA granularity with spillover 416, multiple segments packed to PPA granularity with conflict 418, and/or multiple segments packed to PPA granularity with conflict with spillover 420. At 422, the segment(s) to be packed are drained from the bin queue. At 424, the drained segment(s) are packed into a PPA. At 426, the resulting PPA is released for processing, i.e., the resulting PPA including the drained segments is made available for other processes or for a different tasks.

Figure 5:
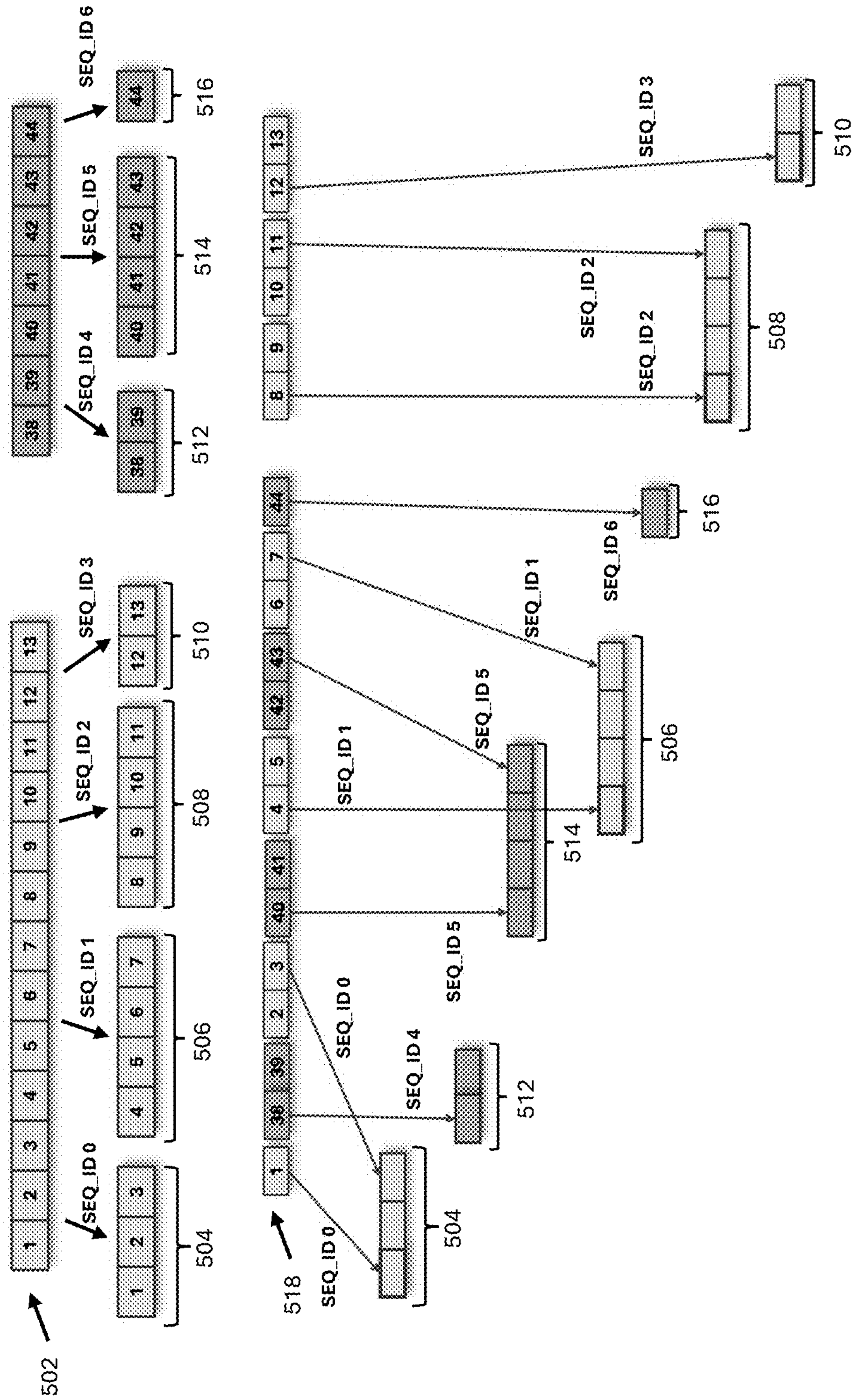
FIG. 5 is a diagram illustrating sequential command segmentation and grouping, according to an embodiment.

FIG. 5 is a diagram illustrating sequential command segmentation and grouping, according to an embodiment. Specifically, FIG. 5 is a detailed description of 402 in FIG. 4. Continuous sequential commands or chunks 502 may be input to the storage system. The input 502 may have a size that is larger than the PPA granularity. The input may be segmented based on the PPA granularity or based on a sequence identifier (SEQ_ID) tag for each segment (e.g., SEQ_ID 0 through SEQ_ID 6). The segmentation results in sequential output with seven segments 504, 506, 508, 510, 512, 514, and 516, which are the size of a PPA (e.g., four PPNs or straight-hand shape) or smaller (e.g., runt-1 (one PPN), runt-2 (two PPNs), runt-3 (3 PPNs)).

Alternatively, a segmented and dispersed sequential input 518 may be received by the storage system. The input may be split and tagged with SEQ_IDs upstream. The input may have a size that is less than the PPA granularity (e.g., one PPN), and the sequential command may be intermixed with other commands. PPN entries for each specific SEQ_ID tag may be buffered and collected resulting in the seven segments 504, 506, 508, 510, 512, 514, and 516. A count of the SIDs or a last SID may be marked before dispersing and during regroup.

Figure 6:
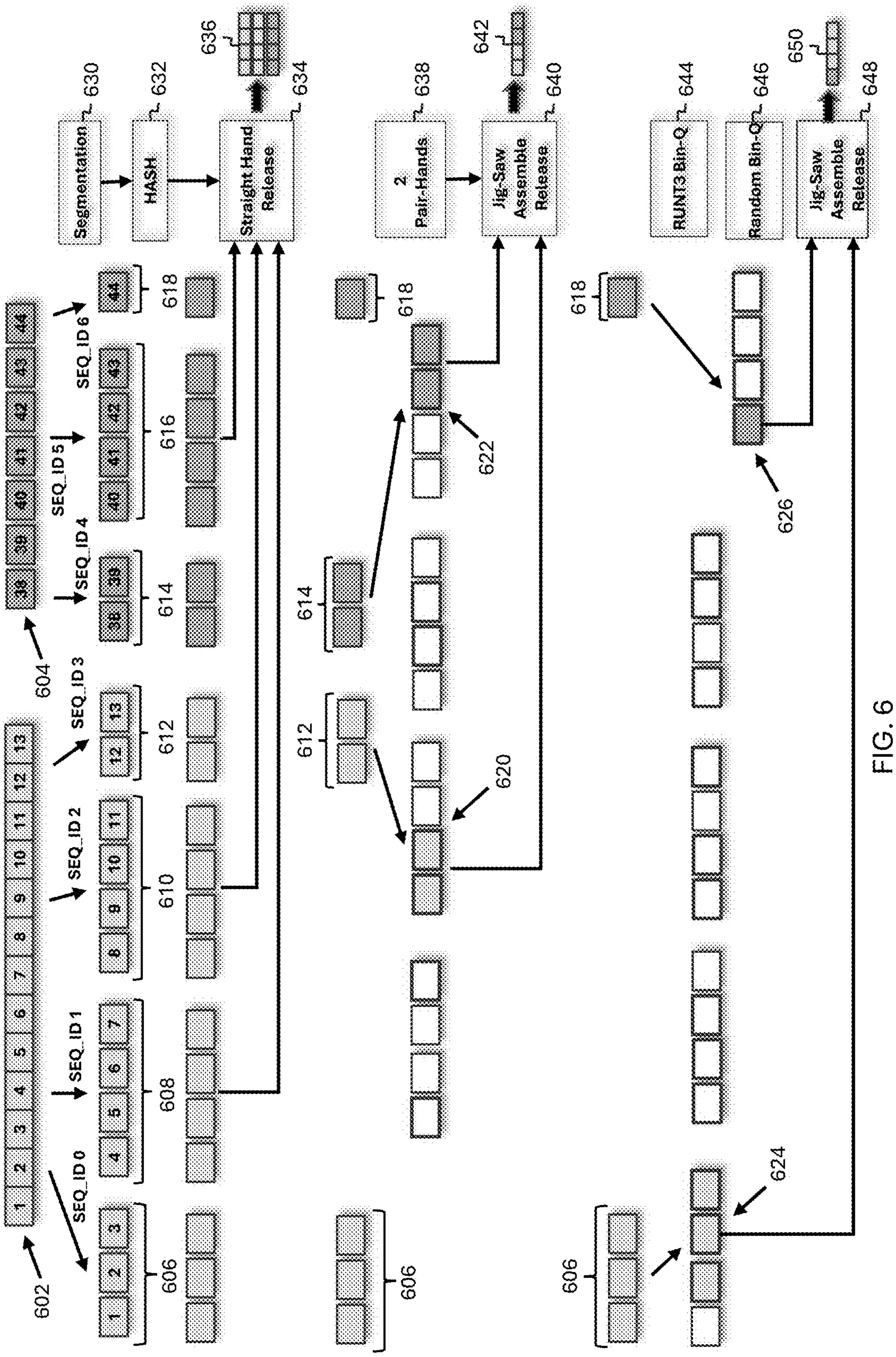
FIG. 6 is a diagram illustrating straight-hand PPA assembly and pack to PPA granularity assembly, according to an embodiment.

FIG. 6 is a diagram illustrating straight-hand PPA assembly and pack to PPA granularity assembly, according to an embodiment. A first command 602 and a second command 604 may be received. The first command 602 may be segmented 630 into a first segment 606 having three PPNs, a second segment 608 having four PPNs, a third segment 610 having four PPNs, and a fourth segment 612 having two PPNs. The second command 604 may be segmented 630 into a fifth segment 614 having two PPNs, a sixth segment 616 having four PPNs, and a seventh segment 618 having one PPN. The segments may be hashed 632, and straight-hand assembly of PPAs 634 is performed for the second segment 608, the third segment 610, and the sixth segment 616, which have a number of PPNs (e.g., four) equal to PPA granularity. The respective PPAs 636 may then be released.

Multiple segments may be packed to PPA granularity. For example, for double-pair hand assembly 638, the fourth segment 612 (two PPNs) and the fifth segment 614 (two PPNs) may be packed and released 640 as a single PPA 642. This assembly is enabled when the segments are in complementary pair (runt-2) bin queues 620 and 622 of a plurality of pair bin queues. Specifically, the fourth segment 612 has first and second PPN entries and the fifth segment 615 has third and fourth PPN entries. Additionally, the first segment 606 (three PPNs, runt-3) and the seventh segment 618 (single PPNs, random) may be packed 644, 646 and released 648 as a single PPA 650. This assembly is enabled when the first segment 606 is in a runt-3 bin queue 624 and the seventh segment 618 is in a complementary random bin queue 626. A random bin queue is a type of runt bin queue for a single PPN entry. Specifically, the first segment 606 has second, third, and fourth PPN entries and the seventh segment 618 has a first PPN entry.

Figure 7:
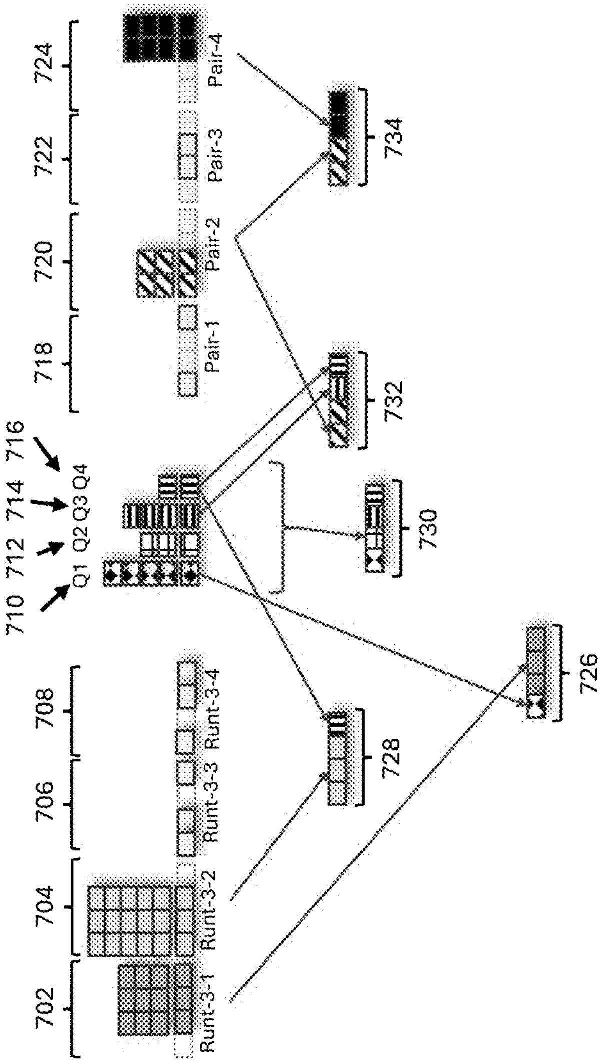
FIG. 7 is a diagram illustrating pack to PPA granularity assembly from bin queues, according to an embodiment.

FIG. 7 is a diagram illustrating pack to PPA granularity assembly from bin queues, according to an embodiment. A first runt-3 bin queue 702 is shown with four segments and a second runt-3 bin queue 704 is shown with six segments, while a third runt-3 bin queue 706 and a fourth runt-3 bin queue 708 are empty. Each runt-3 bin queue is for a different shape configuration of three PPN entries. For example, the first runt-3 bin queue 702 is for PPN entries one through three, the second runt-3 bin queue 704 is for PPN entries two through four, the third runt-3 bin queue is for PPN entries one, two and four, and the fourth runt-3 bin queue is for PPN entries one, three, and four. A first random bin queue 710 for the first PPN entry is shown with five segments, a second random bin queue 712 for the second PPN entry is shown with three segments, a third random bin queue 714 for the third PPN entry is shown with four segments, and fourth bin random queue 716 for the fourth PPN entry is shown with two segments. A random bin queue is a type of runt bin queue for a sing PPN entry (e.g., a runt-1 bin queue). A second pair bin queue (runt-2 bin queue) 720 for the first and second PPN entries is shown with three segments and a fourth pair bin queue 724 for the third and fourth PPN entries is shown with four segments, while a first pair bin queue 718 for the first and fourth PPN entries and a third pair bin queue 720 for the second and third PPN entries are empty.

A segment from the first runt-3 bin queue 702 may be packed with a segment from the first random bin queue 710 to form a first PPA 726. A segment from the second runt-3 bin queue 704 may be packed with a segment from the fourth random bin queue 716 to form a second PPA 728. A segment from each of the random bin queues may be packed together to form a third PPA 730. A segment from the second pair bin queue 720 may be packed with a segment from the third random bin queue 714 and a segment from the fourth random bin queue 716 to form a fourth PPA 732. A segment from the second pair bin queue 720 may be packed with a segment from the fourth pair bin queue 724 to form a fifth PPA 734.

Figure 8:
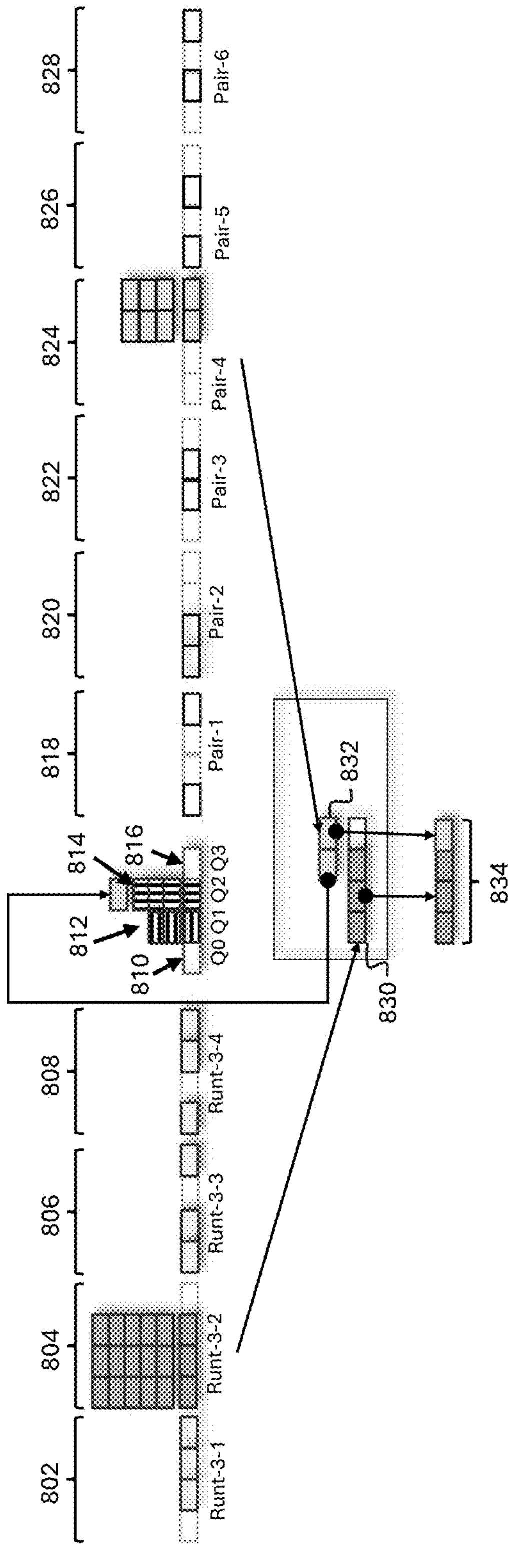
FIG. 8 is a diagram illustrating pack to PPA granularity assembly with spillover, according to an embodiment.

FIG. 8 is a diagram illustrating pack to PPA granularity assembly with spillover, according to an embodiment. Six segments are shown in a second runt-3 bin queue 804, while a first runt-3 bin queue 802, a third runt-3 bin queue 806, and a fourth runt-3 bin queue 808 are empty. Three segments are shown in a second random bin queue 812 and four segments are shown in a third random bin queue 814, while a first random bin queue 810 and a fourth random bin queue 816 are empty. Four segments are shown in a fourth pair bin queue 824, while a first pair bin queue 818, a second pair bin queue 820, a third pair bin queue 822, a fifth pair bin queue 826, and a sixth pair bin queue 828 are empty.

Spillover may be triggered when a bin queue is full, and queued segments may only achieve packing to a PPA granularity with an extra PPN entry remaining after packing. For example, a first segment 830 from the second runt-3 bin queue 804 may be packed with a second segment 832 from the fourth pair bin queue 824. The non-overlapping PPN entries from the first segment 830 and the second segment 832 may be packed to PPA granularity resulting in PPA 834, and an overlapping or spillover PPN entry may be restocked to the appropriate bin queue. For example, since there is only overlap at the third PPN entry, this overlapping or spillover PPN entry is restocked to the third random bin queue 814, which corresponds to the third PPN entry.

Figure 9:
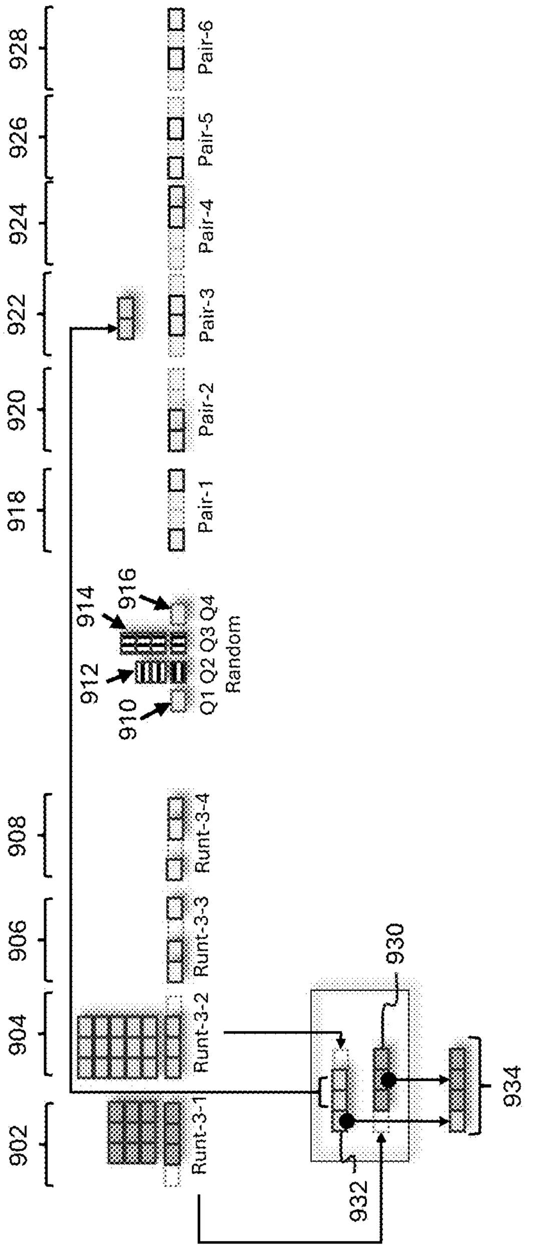
FIG. 9 is a diagram illustrating pack to PPA granularity assembly with spillover, according to another embodiment.

FIG. 9 is a diagram illustrating pack to PPA granularity assembly with spillover, according to another embodiment. Four segments are shown in a first runt-3 bin queue 902 and six segments are shown in a second runt-3 bin queue 904, while a third runt-3 bin queue 906 and a fourth runt-3 bin queue 908 are empty. Three segments are shown in a second random bin queue 912 and four segments are shown in a third random bin queue 914, while a first random bin queue 910 and a fourth random bin queue 916 are empty. A first pair bin queue 918, a second pair bin queue 920, a third pair bin queue 922, a fourth bin queue 924, a fifth pair bin queue 926, and a sixth pair bin queue 928 are empty.

Spillover may be triggered when a bin queue is full, and queued segments may only achieve packing to PPA granularity with an extra PPN entry remaining after packing. For example, a first segment 930 from the first runt-3 bin queue 902 may be packed with a second segment 932 from the second runt-3 bin queue 904. The non-overlapping PPN entries from the first segment 930 and the second segment 932 may be packed to PPA granularity resulting in PPA 934, and overlapping or spillover PPN entries may be restocked to the appropriate bin queue. For example, since there is overlap at the second and third PPN entries, the overlapping or spillover PPN entries are restocked to the third pair bin queue 914, which corresponds to the second and third PPN entries.

While spillover may be triggered by filling a bin queue, it may also be triggered without filling a bin queue. For a sequential read command, spillover may have an effect on power and die contention, but not latency. For a random read command, spillover has no effect on power, die contention, or latency. Generally, in performing spillover, segments may be combined in an effort to minimize the amount of spillover and restocking.

Figure 10:
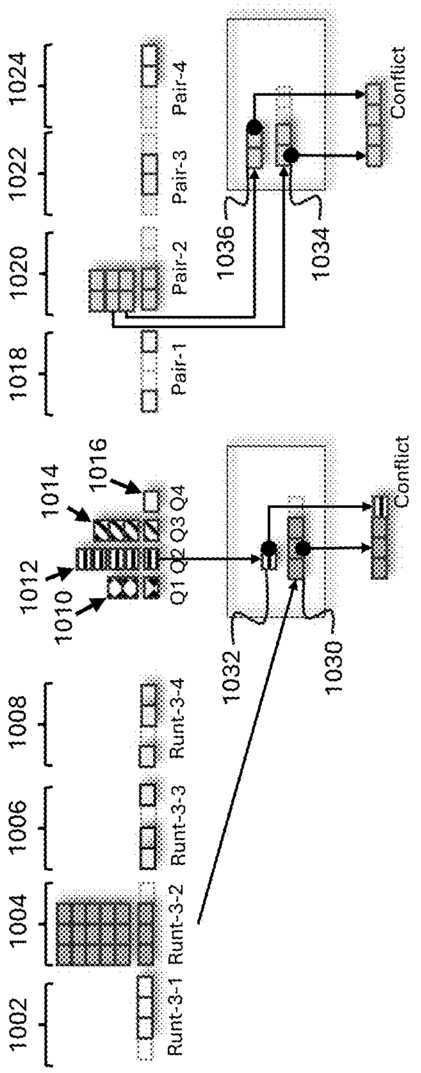
FIG. 10 is a diagram illustrating pack to PPA granularity assembly with conflict resolution, according to an embodiment.

FIG. 10 is a diagram illustrating pack to PPA granularity assembly with conflict resolution, according to an embodiment. Six segments are shown in a second runt-3 bin queue 1004, while a first runt-3 bin queue 1002, a third runt-3 bin queue 1006, and a fourth runt-3 bin queue 1008 are empty. Three segments are shown in a first random bin queue 1010, five segments are shown in a second random bin queue 1012, and four segments are shown in a third random bin queue 1014, while a fourth random bin queue 1016 is empty. Four segments are shown in a second pair bin queue 1020, while a first pair bin queue 1018, a third pair bin queue 1022, and a fourth pair bin queue 1024 are empty.

Conflict resolution may be triggered when a bin queue is full and when existing segments cannot be packed to PPA granularity with or without spillover. For example, a first segment 1030 from the second runt-3 bin queue 1004 requires a fourth PPN entry for PPA granularity packing. Conflict resolution may be performed using any random PPN entry from the first to third random bin queues (e.g., a second segment 1032 from the second random bin queue 1012), moving the random PPN entry to the fourth position to complete packing with the first segment 1030. As another example, a third segment 1034 and a fourth segment 1036 from the second pair bin queue 1020 may be packed by performing conflict resolution on one of the segments and moving its position from the first and second PPN entries to the third and fourth PPN entries of the PPA.

Figure 11:
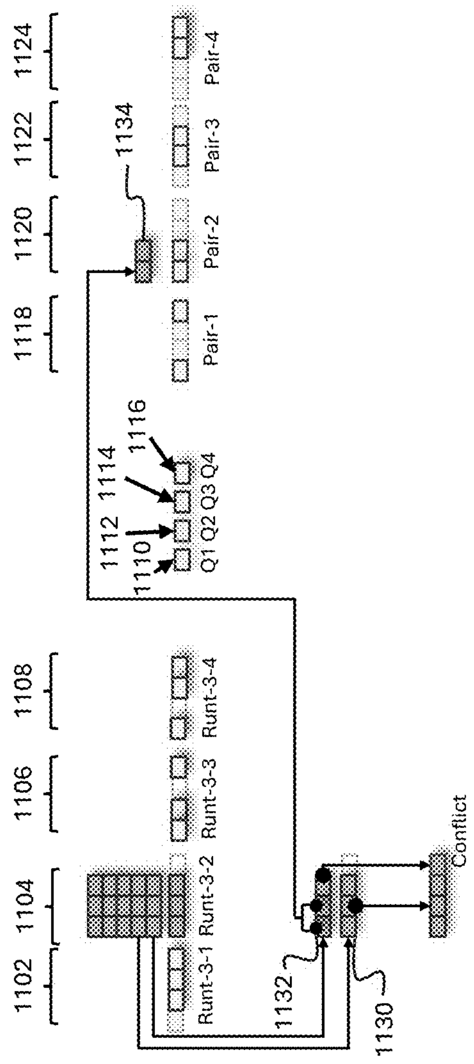
FIG. 11 is a diagram illustrating pack to PPA granularity assembly with conflict resolution and spillover, according to an embodiment.

FIG. 11 is a diagram illustrating pack to PPA granularity assembly with conflict resolution and spillover, according to an embodiment. Six segments are shown in a second runt-3 bin queue 1104, while a first runt-3 bin queue 1102, a third runt-3 bin queue 1106, and a fourth runt-3 bin queue 1108 are empty. A first random bin queue 1110, a second random bin queue 1112, a third random bin queue 1114, and a fourth random bin queue 1116 are empty. A first pair bin queue 1118, a second pair bin queue 1120, a third pair bin queue 1122, and a fourth pair bin queue 1124 are empty.

Conflict resolution may be triggered when a bin queue is full and when existing segments cannot be packed to PPA granularity with or without spillover. For example, a first segment 1130 from the second runt-3 bin queue 1104 requires a fourth PPN entry for straight-hand packing. The only other queued segments are also in the second runt-3 bin queue 1104 and conflict resolution may be performed using a second segment 1132 from the second runt-3 bin queue 1104, moving one PPN entry from the second segment 1132 to the fourth PPN entry position to complete PPA granularity packing with the first segment 1130. Remaining PPN entries in the second segment 1132 that overlap PPN entries of the first segment (e.g., PPN entries 1134 in the first and second positions) may be restocked to the second pair bin queue 1120, which corresponds to the positions of the PPN entries 1134.

Conflict resolution may only be triggered by filling a bin queue. For a read command, conflict resolution may have an effect on both power and latency. If there is also spillover, there may be an additional effect on power for a later sequential read command.

Figure 12:
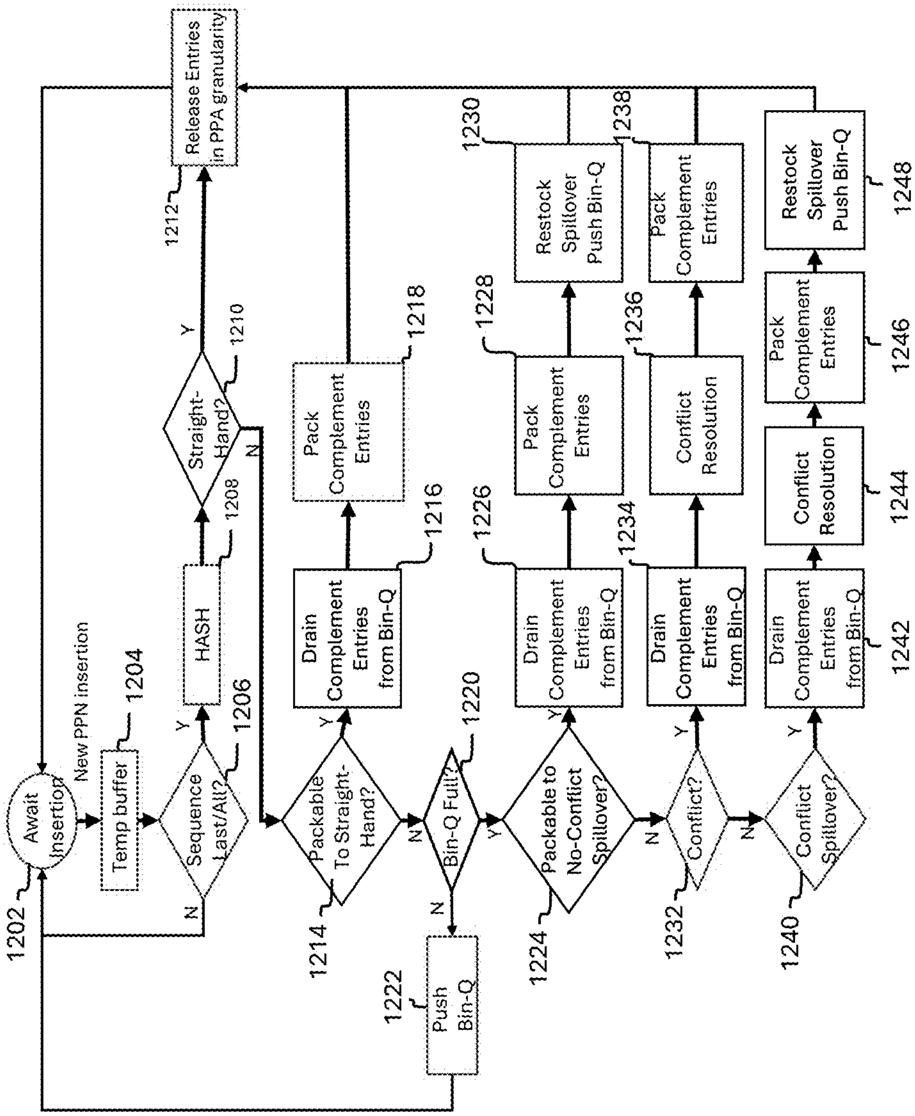
FIG. 12 is a diagram illustrating a method for packing and releasing PPAs, according to an embodiment.

FIG. 12 is a diagram illustrating a method for packing and releasing PPAs, according to an embodiment. At 1202, the system may await insertion of a new PPN. Upon insertion of a new PPN, at 1204, the PPN may be temporarily buffered for segmentation and accumulation. At 1206, it may be determined if this is the last or all of the sequence or segment. If this is not the last or all of the sequence, insertion of a new PPN may be awaited at 1202.

If this is the last or all of the sequence, a hash function may be performed on the sequence at 1208. At 1210, it may be determined if the segment is sized at PPA granularity for straight-hand PPA assembly (e.g., the segment includes 4 PPNs). When the segment is sized for straight-hand PPA assembly, as shown with respect to FIG. 7, the respective PPA may be released at 1212, before returning to await a next PPN insertion at 1202.

Returning to 1210, when a segment is not sized for straight-hand PPA assembly, it may be determined whether segments are packable to PPA granularity without spillover and conflict at 1214. When segments are packable to PPA granularity assembly without spillover and conflict, as shown with respect to the fourth segment 612 and the fifth segment 614 in FIG. 6, the complementary segments may be drained from their respective bin queues at 1216. The complementary segments may be packed to PPA granularity at 1218. The respective PPA may be released at 1212, before returning to await a next PPN insertion at 1202.

Returning to 1214, when segments are not packable to straight-hand PPA assembly without spillover and conflict, it may be determined whether a bin queue is full at 1220. When bin queues are not full, the bin queue may be pushed at 1222 and a next PPN insertion is awaited at 1202. When a bin queue is full, it may be determined whether segments are packable to PPA granularity with spillover, but without conflict resolution, at 1224.

When segments are packable to PPA granularity with spillover, but without conflict resolution, as shown with respect to FIGS. 8 and 9, the complementary segments may be drained from their respective bin queues at 1226. Non-overlapping PPN entries from the complementary segments may be packed to PPA granularity at 1228, and remaining overlapping or spillover PPN(s) between the complementary segments may be restocked to the appropriate bin queue at 1230. The respective PPA may be released at 1212, before returning to await a next PPN insertion at 1202.

Returning to 1224, when segments are not packable to PPA granularity with spillover, but without conflict resolution, it may be determined whether conflict resolution between segments results in packing to PPA granularity at 1232. When conflict resolution results in packing to PPA granularity, as shown with respect to FIG. 10, the complementary segments may be drained from their respective bin queues at 1234. At 1236, conflict resolution may be performed by moving one or more PPN entries of a first segment to PPN position(s) that complete PPA granularity with a second segment. At 1238, the moved PPN entries of the first segment may be packed with the second segment. The respective PPA may be released at 1212, before returning to await a next PPN insertion at 1202.

Returning to 1232, when conflict resolution does not result in packing to PPA granularity, it may be determined whether conflict resolution with spillover between segments results in packing to PPA granularity at 1240. When conflict resolution with spillover results in packing to PPA granularity, as shown with respect to FIG. 11, the complementary segments may be drained from their respective bin queues at 1242. At 1244, conflict resolution may be performed by moving one or more PPNs of a first segment to PPN position(s) that complete straight-hand packing with a second segment. At 1246, the moved PPN entries of the first segment may be packed with the second segment. At 1248, remaining overlapping or spillover PPN entry between the complementary segments may be restocked to the appropriate bin queue. The respective PPA may be released at 1212, before returning to await a next PPN insertion at 1202.

A cost weight for each combination of entries may be provided in accordance with Table 2 below, with the lowest cost taking precedence in packing and releasing PPAs.

| | | | Release | | | |
|---|---|---|---|---|---|---|
| # | Item | Source Entry | In Place | Conflict (×10) | Spillover (×1) | Cost |
| 1 | Straight-Hand | 0 + 1 + 2 + 3 | 4 | — | — | 0 |
| 2 | Straight-Hand Packed | (0, 1) + (2, 3) | 4 | — | — | 0 |
| 3 | Straight-Hand Packed | 0 + 1 + (2, 3) | 4 | — | — | 0 |
| 4 | Straight-Hand Packed | (0, 3) + (1, 2) | 4 | — | — | 0 |
| 5 | Straight-Hand Packed | (0, 1, 2) + 3 | 4 | — | — | 0 |
| 6 | Straight-Hand Packed | 1 + (1, 2, 3) | 4 | — | — | 0 |
| 7 | Spillover | (0, 1) + (1, 2, 3) | 4 | — | 1 | 1 |
| 8 | Spillover | (2, 3) + (0, 1, 2) | 4 | — | 1 | 1 |
| 9 | Spillover | (0, 1, 2) + (1, 2, 3) | 4 | — | 2 | 2 |
| 10 | Conflict | (0, 1, 2) + 0 | 3 | 1 | — | 10 |
| 11 | Conflict | (0, 1) + (1, 2) | 3 | 1 | — | 10 |
| 12 | Conflict | (0, 1) + (0, 1) | 2 | 2 | — | 20 |
| 13 | Conflict | 0 + 0 + 0 + 0 | 1 | 3 | — | 30 |
| 14 | Conflict -n- Spillover | (0, 1, 2) + (0, 1) | 3 | 1 | 1 | 11 |
| 15 | Conflict -n- Spillover | (0, 1, 2) + (0, 1, 2) | 3 | 1 | 2 | 11 |

As shown above, straight-hand and straight-hand packed have no cost, spillover has a cost of one per count, and conflict has a cost of 10 per count.

The hash function cannot be scaled above PPA granularity as it results in a higher conflict rate. The Hash function may assign continuous PPNs to different PPAs, and conflict resolution may assign continuous PPNs to different PPAs. A number of bin queues may increase exponentially, and the assembler cases may increase exponentially.

For a multi-segment hash function, the LPN to PPN may be split into most significant bit (MSB), central significant bit (CSB), and least significant bit (LSB) segments. For LSB mapping an LSB hash function may be used with a jigsaw assembler. For CSB mapping a CSB hash function may be used with a random input assembler. For MSB mapping, an L2P LUT may be used.

For a write command, the LSB hash function may classify and store in a jigsaw bin queue. Specifically, input may be stored in a temporary buffer, where it is segmented and accumulated to PPA granularity or last of sequence, before jigsaw assembly as straight-hand, packed straight-hand, spillover, and/or conflict resolution. The CSB hash function may classify and store in a random input bin queue. Specifically, only one entry may be provided for each bin queue, there is only straight-hand and conflict resolution assembly, and the input is not stored in a temporary buffer.

For a read command, the hashed LSB and CSB may be combined with L2P MSB. If an LSB meta check detects a conflict, a next link is to a new LSB position in a same PPA. IF a CSB meta check detects a conflict, a next link is to a new CSB position of a different die or plane.

CSB jigsaw classify and assemble may be enabled, which may maximize throughput for a plane-independent read command, but results in a more complex jigsaw assembler.

Figure 13:
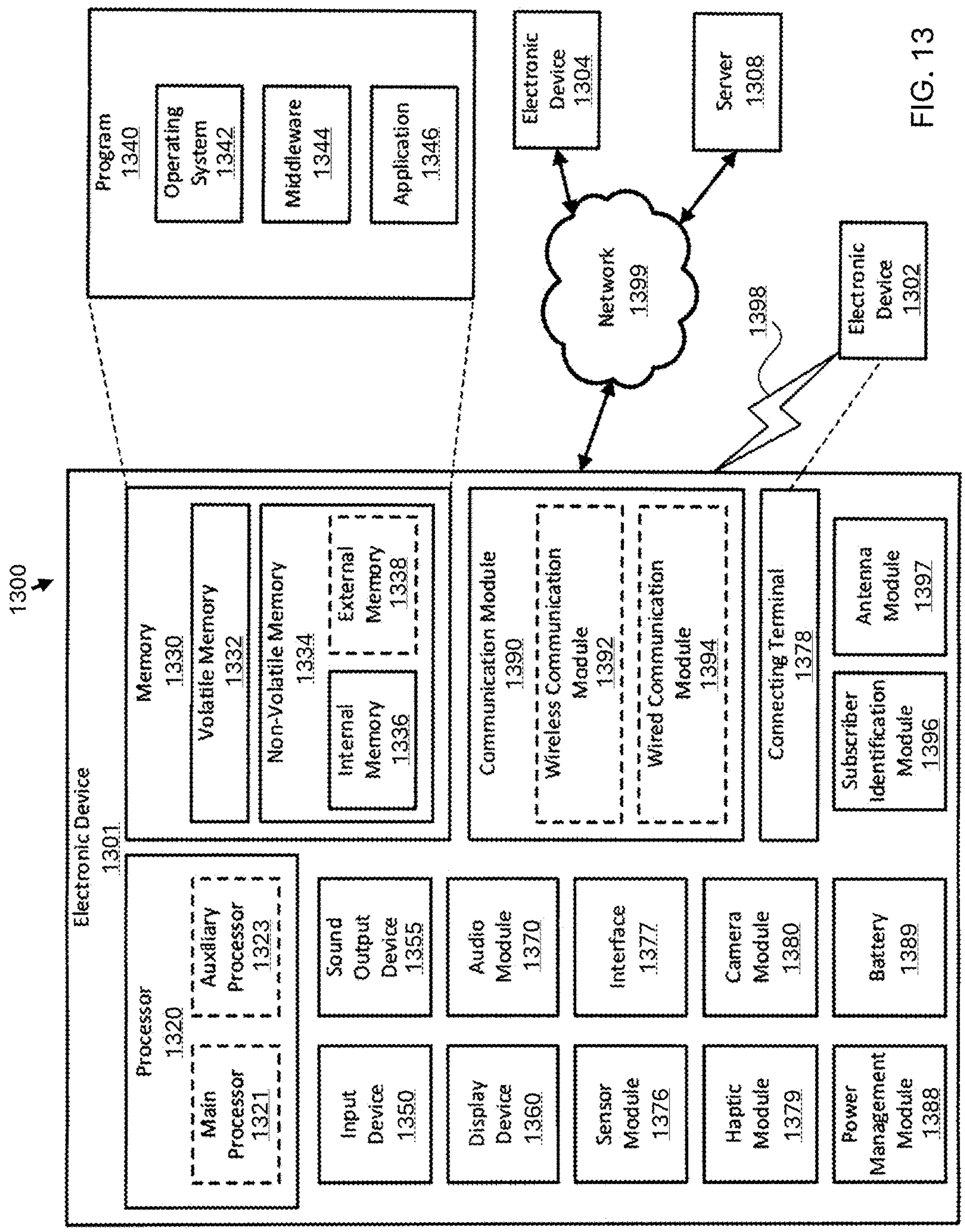
FIG. 13 is a block diagram of an electronic device in a network environment for processing commands, according to an embodiment.

FIG. 13 is a block diagram of an electronic device in a network environment 1300 for processing commands, according to an embodiment. This electronic device may be one of various types of electronic devices that utilizes storage devices described above in FIGS. 1 and 6.

Referring to FIG. 13, an electronic device 1301 in a network environment 1300 may communicate with an electronic device 1302 via a first network 1398 (e.g., a short-range wireless communication network), or an electronic device 1304 or a server 1308 via a second network 1399 (e.g., a long-range wireless communication network). The electronic device 1301 may communicate with the electronic device 1304 via the server 1308. The electronic device 1301 may include a processor 1320, a memory 1330, an input device 1350, a sound output device 1355, a display device 1360, an audio module 1370, a sensor module 1376, an interface 1377, a haptic module 1379, a camera module 1380, a power management module 1388, a battery 1389, a communication module 1390, a subscriber identification module (SIM) card 1396, or an antenna module 1397. In one embodiment, at least one (e.g., the display device 1360 or the camera module 1380) of the components may be omitted from the electronic device 1301, or one or more other components may be added to the electronic device 1301. Some of the components may be implemented as a single integrated circuit (IC). For example, the sensor module 1376 (e.g., a fingerprint sensor, an iris sensor, or an illuminance sensor) may be embedded in the display device 1360 (e.g., a display).

The processor 1320 may execute software (e.g., a program 1340) to control at least one other component (e.g., a hardware or a software component) of the electronic device 1301 coupled with the processor 1320 and may perform various data processing or computations.

As at least part of the data processing or computations, the processor 1320 may load a command or data received from a host or another component (e.g., the sensor module 1376 or the communication module 1390) in volatile memory 1332, process the command or the data stored in the volatile memory 1332, and store resulting data in non-volatile memory 1334. The processor 1320 may include a main processor 1321 (e.g., a central processing unit (CPU) or an application processor (AP)), and an auxiliary processor 1323 (e.g., a graphics processing unit (GPU), an image signal processor (ISP), a sensor hub processor, or a communication processor (CP)) that is operable independently from, or in conjunction with, the main processor 1321. Additionally or alternatively, the auxiliary processor 1323 may be adapted to consume less power than the main processor 1321, or execute a particular function. The auxiliary processor 1323 may be implemented as being separate from, or a part of, the main processor 1321.

The auxiliary processor 1323 may control at least some of the functions or states related to at least one component (e.g., the display device 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). The auxiliary processor 1323 (e.g., an image signal processor or a communication processor) may be implemented as part of another component (e.g., the camera module 1380 or the communication module 1390) functionally related to the auxiliary processor 1323.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334. Non-volatile memory 1334 may include internal memory 1336 and/or external memory 1338. The memory 1330 may be embodied as the storage device 104 of FIG. 1.

The program 1340 may be stored in the memory 1330 as software, and may include, for example, an operating system (OS) 1342, middleware 1344, or an application 1346.

The input device 1350 may receive a command or data to be used by another component (e.g., the processor 1320) of the electronic device 1301, from the outside (e.g., a user) of the electronic device 1301. The input device 1350 may include, for example, a microphone, a mouse, or a keyboard.

The sound output device 1355 may output sound signals to the outside of the electronic device 1301. The sound output device 1355 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 1360 may visually provide information to the outside (e.g., a user) of the electronic device 1301. The display device 1360 may include, for example, a display, a hologram device, or a projector and control circuitry to control a corresponding one of the display, hologram device, and projector. The display device 1360 may include touch circuitry adapted to detect a touch, or sensor circuitry (e.g., a pressure sensor) adapted to measure the intensity of force incurred by the touch.

The audio module 1370 may convert a sound into an electrical signal and vice versa. The audio module 1370 may obtain the sound via the input device 1350 or output the sound via the sound output device 1355 or a headphone of an external electronic device 1302 directly (e.g., wired) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. The sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device 1302 directly (e.g., wired) or wirelessly. The interface 1377 may include, for example, a high-definition multimedia interface (HDMI), a universal serial bus (USB) interface, a secure digital (SD) card interface, or an audio interface.

A connecting terminal 1378 may include a connector via which the electronic device 1301 may be physically connected with the external electronic device 1302. The connecting terminal 1378 may include, for example, an HDMI connector, a USB connector, an SD card connector, or an audio connector (e.g., a headphone connector).

The haptic module 1379 may convert an electrical signal into a mechanical stimulus (e.g., a vibration or a movement) or an electrical stimulus which may be recognized by a user via tactile sensation or kinesthetic sensation. The haptic module 1379 may include, for example, a motor, a piezoelectric element, or an electrical stimulator.

The camera module 1380 may capture a still image or moving images. The camera module 1380 may include one or more lenses, image sensors, image signal processors, or flashes. The power management module 1388 may manage power supplied to the electronic device 1301. The power management module 1388 may be implemented as at least part of, for example, a power management integrated circuit (PMIC).

The battery 1389 may supply power to at least one component of the electronic device 1301. The battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the AP) and supports a direct (e.g., wired) communication or a wireless communication. The communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as BLUETOOTH™, wireless-fidelity (Wi-Fi) direct, or a standard of the Infrared Data Association (IrDA)) or the second network 1399 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The antenna module 1397 may transmit or receive a signal or power to or from the outside (e.g., the external electronic device) of the electronic device 1301. The antenna module 1397 may include one or more antennas, and, therefrom, at least one antenna appropriate for a communication scheme used in the communication network, such as the first network 1398 or the second network 1399, may be selected, for example, by the communication module 1390 (e.g., the wireless communication module 1392). The signal or the power may then be transmitted or received between the communication module 1390 and the external electronic device via the selected at least one antenna.

Commands or data may be transmitted or received between the electronic device 1301 and the external electronic device 1304 via the server 1308 coupled with the second network 1399. Each of the electronic devices 1302 and 1304 may be a device of a same type as, or a different type, from the electronic device 1301. All or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 1301. The electronic device 1301 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method comprising:

grouping, by a controller of a storage device, physical page number (PPN) entries into PPN segments, the PPN entries corresponding to a command received at the storage device;

classifying, by the controller, the PPN segments into bin queues of the storage device based on PPN segment size and PPN entry placement with respect to a physical page (PPA) granularity;

packing, by the controller, a PPA with one or more PPN segments from the bin queues to the PPA granularity; and releasing the PPA by the controller.

2. The method of claim 1, wherein grouping the PPN entries comprises:

segmenting the PPN entries into the PPN segments based on the PPA granularity or sequence identifier (ID) tags on the PPN entries corresponding to the PPN segments.

3. The method of claim 1, further comprising:

performing, by the controller, a hash function on the PPN segments from a PPN granularity to the PPA granularity.

4. The method of claim 1, wherein the bin queues comprise a first bin queue configured to store PPN segments having a size equal to the PPA granularity, and second bin queues configured to store PPN segments having fewer PPN entries than the PPA granularity.

5. The method of claim 4, wherein the second bin queues comprise a set of bin queues for each PPN segment size less than the PPA granularity and each set comprises bin queues for different PPN entry placements.

6. The method of claim 5, wherein packing the PPA comprises one of:

straight-hand packing with a single PPN segment from the first bin queue; or packing to PPA granularity with at least two PPN segments from at least one of the second bin queues.

7. The method of claim 6, wherein packing to PPA granularity comprises one of:

first packing to PPA granularity with the at least two PPN segments, wherein PPN entry placements of the at least two PPN segments are complementary for PPA granularity;

second packing to PPA granularity with the at least two PPN segments with PPN entry overlap between the at least two PPN segments, wherein an overlapping PPN entry is restocked at a bin queue corresponding to a size and placement of the overlapping PPN entry;

third packing to PPA granularity with the at least two PPN segments with conflict resolution moving at least one PPN entry to a different placement to complete PPA granularity; or fourth packing to PPA granularity with the at least two PPN segments with conflict resolution moving the at least one PPN entry to the different placement and PPN entry overlap between the at least two PPN segments, wherein the overlapping PPN entry is restocked at the bin queue corresponding to the size and placement of the overlapping PPN entry.

8. The method of claim 7, further comprising:

determining a type of packing from among the straight-hand packing, the first packing, the second packing, the third packing, and the fourth packing based on packing priority and bin queues with PPN segments; and draining at least one of the bin queues based on the determined type of packing.

9. The method of claim 8, wherein, in determining the type of packing:

the straight-hand packing is performed upon reception of the single PPN segment at the first bin queue;

the first packing is performed upon reception of the at least two PPN segments with PPN entry placements that are complementary for PPA granularity; and the second packing, the third packing, or the fourth packing are performed in case that a bin queue is full.

10. The method of claim 9, wherein determining the type of packing from among the second packing, the third packing, and the fourth packing is based on:

a cost function based on a first number of overlapping PPN entries required to be restocked and a second number of conflicting PPN entries required to be moved; or packing priority, wherein the second packing has a highest packing priority, followed by the third packing, and the fourth packing.

11. The method of claim 1, further comprising splitting a full PPA into the PPA and at least a second PPA, wherein the PPA granularity is a portion of a full PPA granularity.

12. A storage device, comprising:

a controller; and a non-transitory computer readable storage medium storing instructions that, when executed, cause the controller to:

group physical page number (PPN) entries into PPN segments, the PPN entries corresponding to a command received at the storage device;

classify the PPN segments into bin queues of the storage device based on PPN segment size and PPN entry placement with respect to a physical page (PPA) granularity;

pack a PPA with one or more PPN segments from the bin queues to the PPA granularity; and release the PPA.

13. The storage device of claim 12, wherein, in grouping the PPN entries, the instructions further cause the controller to:

segment the PPN entries into the PPN segments based on the PPA granularity or sequence identifier (ID) tags on the PPN entries corresponding to the PPN segments.

14. The storage device of claim 12, wherein the instructions further cause the controller to:

perform a hash function on the PPN segments from a PPN granularity to the PPA granularity.

15. The storage device of claim 12, wherein the bin queues comprise a first bin queue configured to store PPN segments having a size equal to the PPA granularity, and second bin queues configured to store PPN segments having fewer PPN entries than the PPA granularity.

16. The storage device of claim 15, wherein the second bin queues comprise a set of bin queues for each PPN segment size less than the PPA granularity and each set comprises bin queues for different PPN entry placements.

17. The storage device of claim 16, wherein packing the PPA comprises one of:

straight-hand packing with a single PPN segment from the first bin queue; or packing to PPA granularity with at least two PPN segments from at least one of the second bin queues.

18. The storage device of claim 17, wherein packing to PPA granularity comprises one of:

first packing to PPA granularity with the at least two PPN segments, wherein PPN entry placements of the at least two PPN segments are complementary for PPA granularity;

second packing to PPA granularity with the at least two PPN segments with PPN entry overlap between the at least two PPN segments, wherein an overlapping PPN entry is restocked at a bin queue corresponding to a size and placement of the overlapping PPN entry;

third packing to PPA granularity with the at least two PPN segments with conflict resolution moving at least one PPN entry to a different placement to complete PPA granularity; or fourth packing to PPA granularity with the at least two PPN segments with conflict resolution moving the at least one PPN entry to the different placement and PPN entry overlap between the at least two PPN segments, wherein the overlapping PPN entry is restocked at the bin queue corresponding to the size and placement of the overlapping PPN entry.

19. The storage device of claim 18, wherein the instructions further cause the controller to:

determine a type of packing from among the straight-hand packing, the first packing, the second packing, the third packing, and the fourth packing based on packing priority and bin queues with PPN segments; and drain at least one of the bin queues based on the determined type of packing.

20. The storage device of claim 19, wherein, in determining the type of packing:

the straight-hand packing is performed upon reception of the single PPN segment at the first bin queue;

the first packing is performed upon reception of the at least two PPN segments with PPN entry placements that are complementary for PPA granularity; and the second packing, the third packing, or the fourth packing are performed in case that a bin queue is full.

21. The storage device of claim 20, wherein determining the type of packing from among the second packing, the third packing, and the fourth packing is based on:

a cost function based on a first number of overlapping PPN entries required to be restocked and a second number of conflicting PPN entries required to be moved; or packing priority, wherein the second packing has a highest packing priority, followed by the third packing and the fourth packing.

22. The storage device of claim 12, wherein the instructions further cause the controller to split a full PPA into the PPA and at least a second PPA, wherein the PPA granularity is a portion of a full PPA granularity.

* * * * *